(12) United States Patent
Wilson et al.

(10) Patent No.: US 7,740,028 B1
(45) Date of Patent: Jun. 22, 2010

(54) COMPOSITE PLUG SYSTEM AND PROCESS FOR HIGH PRESSURE PIPELINE LEAKS

(75) Inventors: Jeffrey M. Wilson, Tulsa, OK (US);
Michael R. Kessler, Ames, IA (US);
Roger Walker, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 1186 days.

(21) Appl. No.: 11/307,122

(22) Filed: Jan. 24, 2006

(51) Int. Cl.
*F16L 55/16* (2006.01)

(52) U.S. Cl. .............................. 138/99; 138/97; 138/89; 138/92; 138/94

(58) Field of Classification Search .................... 138/99, 138/97, 89, 92, 94
See application file for complete search history.

(56) References Cited

U.S. PATENT DOCUMENTS

| | | | | |
|---|---|---|---|---|
| 150,255 | A | * | 4/1874 | Phillips ........................ 138/98 |
| 645,502 | A | * | 3/1900 | Carpenter .................... 152/369 |
| 776,697 | A | * | 12/1904 | Sieverling ................... 152/369 |
| 1,131,745 | A | * | 3/1915 | Stephens ..................... 152/370 |
| 2,020,767 | A | * | 11/1935 | Bullis et al. .................. 138/98 |
| 2,476,601 | A | * | 7/1949 | Harper ........................ 114/227 |
| 2,924,546 | A | * | 2/1960 | Shaw ........................... 156/94 |
| 3,834,107 | A | * | 9/1974 | Standing ...................... 52/514 |
| 4,574,971 | A | * | 3/1986 | Leonard ...................... 220/235 |
| 4,588,626 | A | | 5/1986 | Cologna et al. ............... 428/63 |
| 4,756,337 | A | * | 7/1988 | Settineri ...................... 138/99 |
| 4,820,564 | A | | 4/1989 | Cologna et al. ............... 428/63 |
| 4,848,056 | A | | 7/1989 | Kelly .......................... 52/514 |
| 5,033,949 | A | | 7/1991 | Jewett ......................... 425/12 |
| 5,058,519 | A | * | 10/1991 | Collins ....................... 114/227 |
| 5,894,864 | A | * | 4/1999 | Rich ........................... 138/99 |
| 5,954,095 | A | * | 9/1999 | Grigory et al. ................ 138/98 |

* cited by examiner

*Primary Examiner*—James F Hook
(74) *Attorney, Agent, or Firm*—Head, Johnson & Kachigian, P.C.

(57) ABSTRACT

A composite plug system and a process to repair a hole in a tubular pipe. The process includes the steps of inserting a fastener through an opening in an oblong inner plate having an elongated diameter and a shorter diameter. The oblong plate is inserted into the pipe hole wherein the elongated diameter is greater than a diameter of the pipe hole and wherein the shorter diameter is less than the pipe hole diameter so that the oblong plate is within the tubular pipe beneath the hole. An initially liquid adhesive filler is applied over the oblong inner plate over the pipe hole. An outer plate having a central opening and a diameter larger than the pipe hole diameter is affixed over the pipe hole so that the central opening receives the fastener. The outer plate is secured to the oblong inner plate and the tubular pipe with the fastener until the adhesive filler solidifies. After the filler solidifies, the oblong plate and the outer plate are structurally bonded to the pipe wall through adhesion.

17 Claims, 3 Drawing Sheets

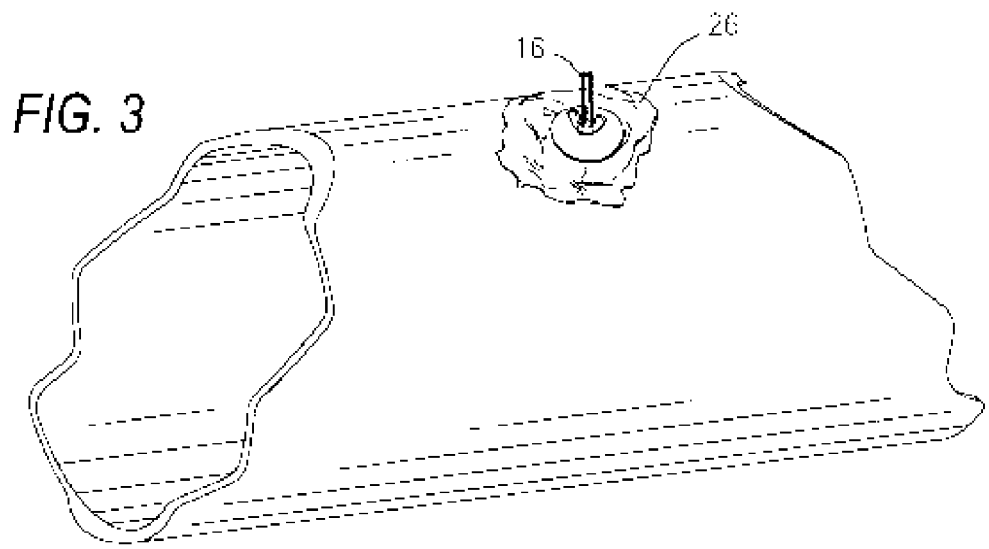
FIG. 3
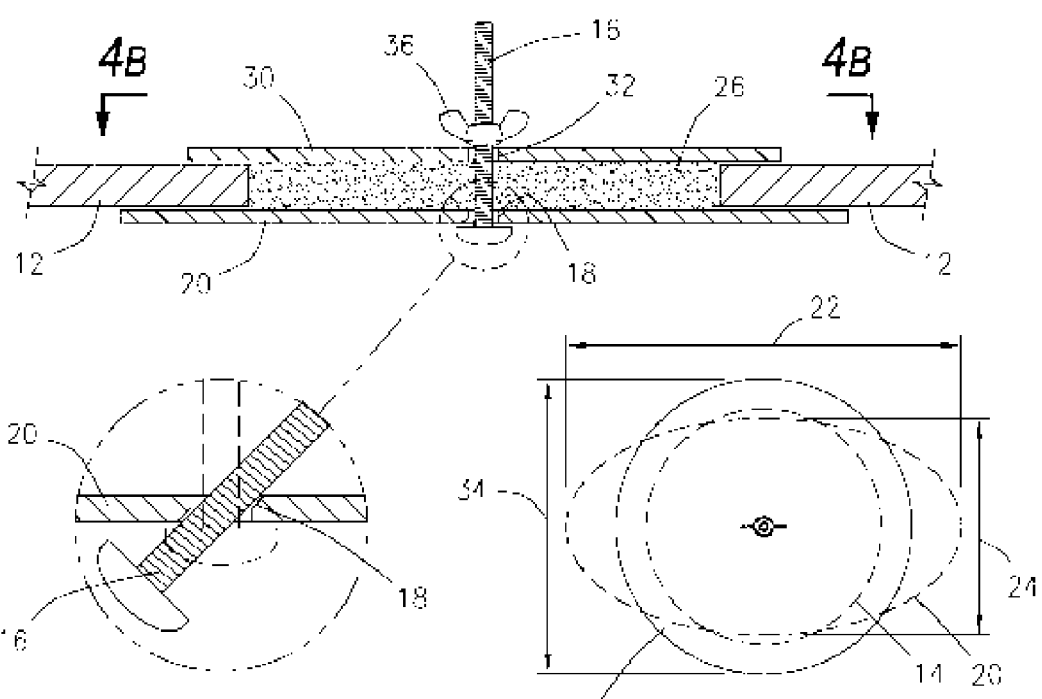
FIG. 4
FIG. 4A
FIG. 4B

FIG. 5
FIG. 6
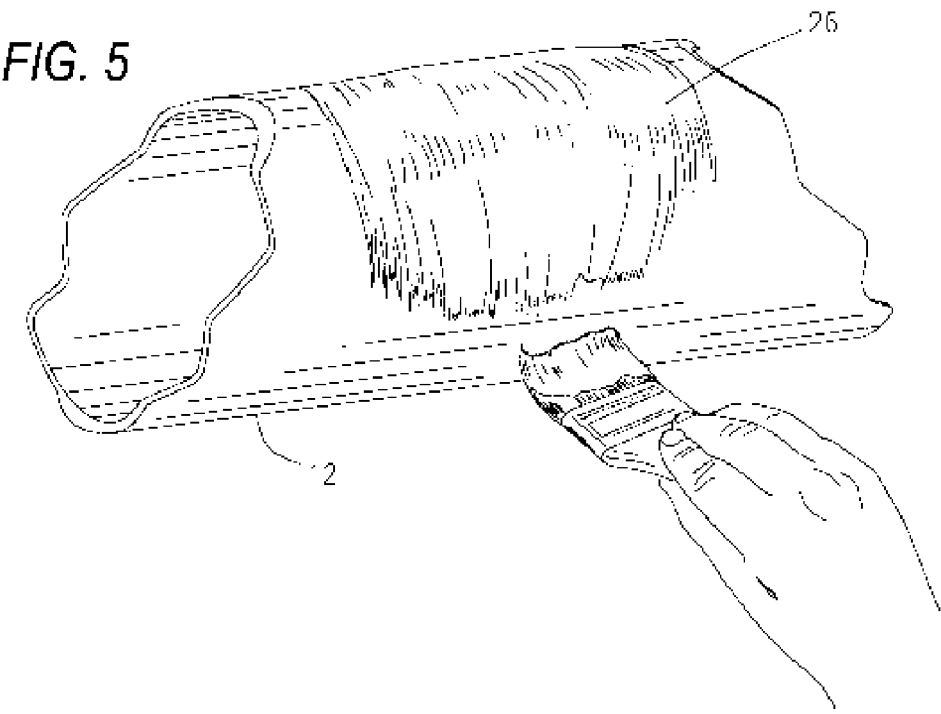
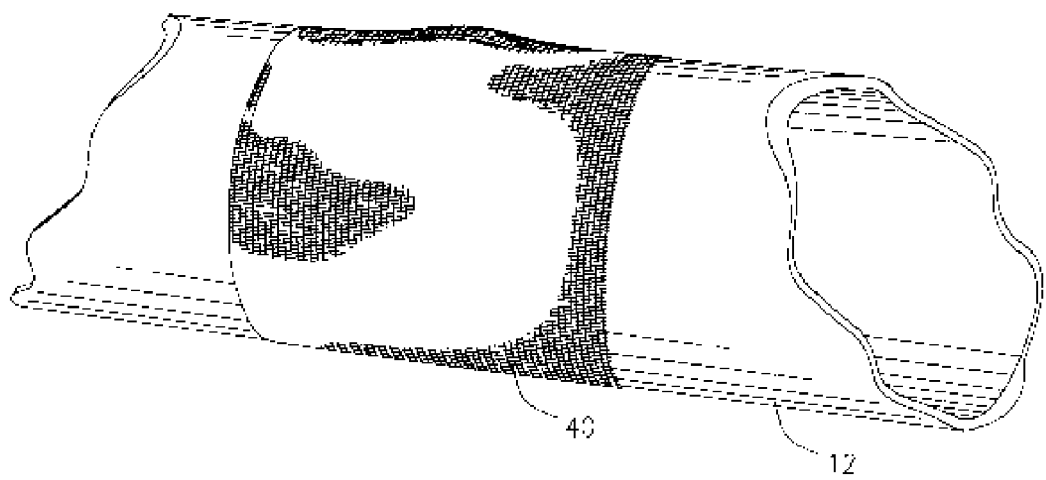

COMPOSITE PLUG SYSTEM AND PROCESS FOR HIGH PRESSURE PIPELINE LEAKS

BACKGROUND OF THE INVENTION

1. Field of the Invention

The present invention is directed to a composite plug system and a process to repair a hole in a tubular pipe. In particular, the present invention is directed to a composite plug system and a process to repair a hole in a tubular pipe which does not require any welding and may be used in high pressure tube and pipeline applications.

2. Prior Art

Pipeline holes or pipe "through wall defects" may be repaired in a variety of ways. In one existing technology, the damaged area of the pipe or pipeline is completely replaced. Total replacement of a damaged section requires the line to be shut down or, alternatively, the flow to be diverted while the damaged section is cut out and replaced by welding with a new cylindrical piece as a replacement. While this effectively solves the problem, it requires considerable welding and access to welding equipment.

An alternative technology is the use of pipe clamps which are, however, limited in the pipe geometries that are repairable (straight sections are best) and also require a uniform outer diameter pipe surface for proper sealing. This is not always the case in damaged pipelines in remote locations.

Another existing technology is welding patches over the holes. While this will often remedy the problem, not only must the fluid flow through the pipeline be stopped but the pipeline should properly be evacuated of all petroleum products to avoid explosion or fire.

Existing composite repair sleeves are also sometimes used but existing systems are not well suited for high pressure pipes or pipelines, such as those over 500 pounds per square inch (psi) where the holes are greater than 0.75 inches in diameter.

Various other repair patch systems have also been proposed in the past. For example, Cologna et al. (U.S. Pat. Nos. 4,588,626 and 4,820,564) discloses a repair patch kit for composite panel materials wherein a bolt head and a solid washer are inserted through a hole to be repaired. A flexible washer and a number of fabric plies are also inserted through the hole. On the exterior side of the hole is a plug 34 and a number of resin impregnated fabric plies. The assembly is held together by a nut secured to the shank of the bolt.

Kelly (U.S. Pat. No. 4,848,056) discloses a hole repairing device having a series of umbrella arms that open up once inside the wall or other structure.

Jewett (U.S. Pat. No. 5,033,949) discloses a hole repair device for repairing a damaged area to a planar surface such as a wall. The hole repair apparatus includes a flexible backing member 1 of a size greater than the hole in the panel. The backing member may be folded or otherwise inserted through the hole. A threaded bolt extends through the flexible patch member and extends outward from the panel. A front dam or panel is used to form an outer wall so that patching material may be inserted between the outer wall and the inner panel.

The repair of petroleum and petrochemical pipelines requires additional precautions as the fluids transported may be under high pressures and may be extremely flammable and combustible. An additional problem is present in petroleum transmission lines in Central and South America, for instance. Each day pipelines in these areas are illegally tapped by those who steal gasoline, petrochemicals and other petroleum products. When the pipeline operator determines the location of the illicit tap, the pipeline is turned off. Due to the remote locations and the frequency of these operations, pipelines are not fully evacuated of the petroleum products while repairs are made. A wooden plug is hammered into the hole and a flat piece of steel is welded over the hole to prevent the line from leaking. Since petroleum or other products may remain in or near the pipeline during this welding process, fires and explosions occur and several people perish each year. Additionally, the wooden plug hammered into the hole may present problems for equipment, such as pipeline pigs, or other cleaning or sensing equipment, that may travel within the interior of the pipeline.

There remains a need to provide a non-metallic tubular pipeline hole repair system that will function in high pressure applications.

There also remains a need to provide a tubular pipeline hole repair system that does not require any welding.

SUMMARY OF THE INVENTION

The present invention is directed to a process and an apparatus to repair a hole in a tubular pipeline.

The process includes a sequence which begins by initially inserting a fastener having a threaded shank and a head through an opening in an oblong inner plate. The oblong inner plate has a first, elongated diameter larger than the diameter of the pipeline hole and a second, shorter diameter smaller than the diameter of the pipeline hole.

Grasping the threaded shank of the fastener, the oblong plate is inserted into and through the hole in the tubular pipe. The oblong plate is positioned within the tubular pipe abutting and flush with the inner wall of the tubular pipe.

The opening through the oblong plate is beveled or tapered so that the angular orientation of the threaded fastener with respect to the oblong inner plate may be altered during the step of inserting the oblong plate into the pipe hole.

Thereafter, an adhesive filler is applied over the oblong inner plate through and over the pipe hole. The adhesive filler is an initially high viscosity liquid adhesive which cures to a solid.

Thereafter, an outer plate having a central opening is placed over the threaded fastener. The outer plate has a diameter larger than the pipe hole. Thereafter, the outer plate is secured to the composite plug assembly by a wing nut or other fastener mechanism.

An optional, additional procedure may be utilized. The extended, threaded end of the fastener extending radially from the tubular pipe is cut off or removed with a grinder. A highly viscous liquid adhesive is thereafter applied over top of the composite plug assembly including the outer plate, the fastener and the tubular pipe. This creates a gradual transition between the outer plate and the pipe. A fabric material is impregnated with a lower viscosity epoxy and the combined fabric and epoxy is wrapped around the pipe to create a composite plug assembly for a high pressure pipeline.

BRIEF DESCRIPTION OF THE DRAWINGS

FIGS. 1 through 3 illustrate a sequential view of the process to install a composite plug for a high pressure pipeline in accordance with the present invention;

FIGS. 4 and 4A illustrate sectional views of the completed composite plug system as illustrated in FIGS. 1 through 3;

FIG. 4B illustrates a sectional view taken along section lines 4B-4B of FIG. 4; and FIGS. 5 and 6 illustrate an optional, additional procedure to form a composite plug system for high pressure pipeline leaks.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
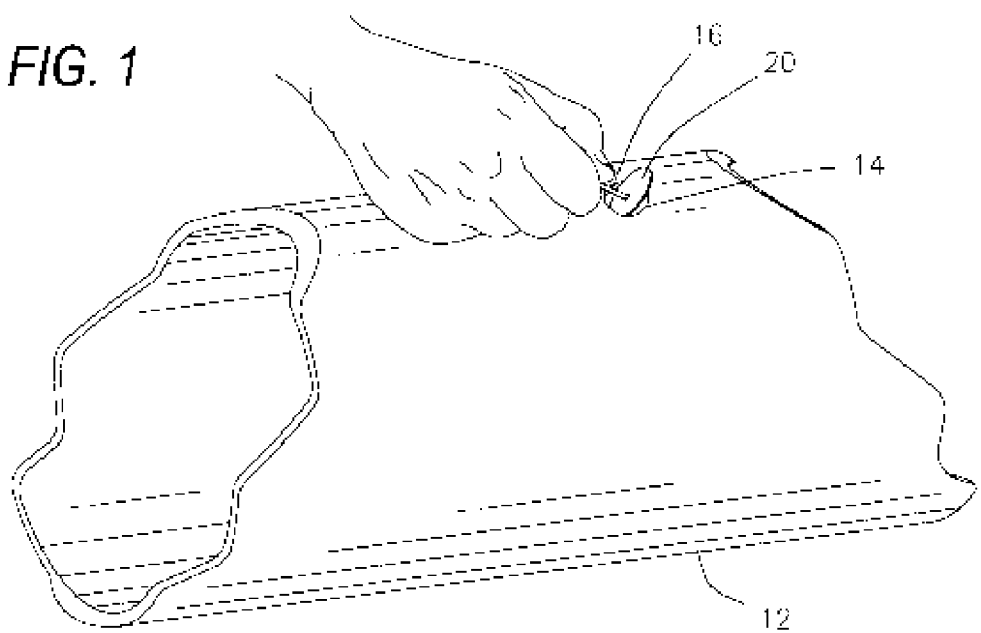
Figure 2:
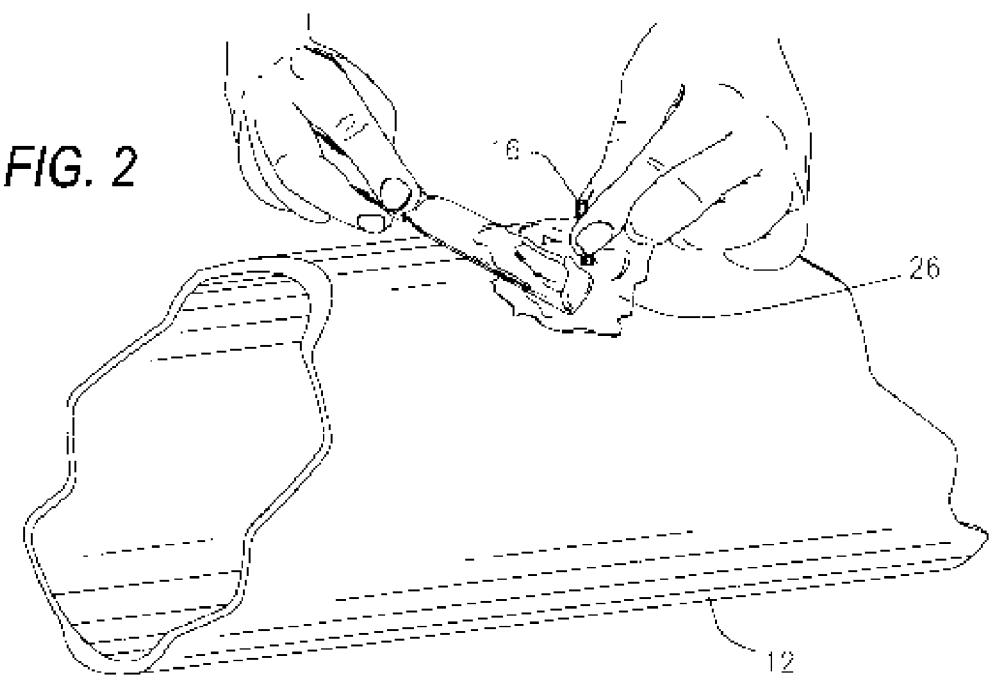

Referring to the drawings in detail, FIGS. 1, 2 and 3 illustrate a sequence utilizing a process to repair a hole in a tubular pipe 12 as set forth in the present invention. The process to repair a hole 14 in the tubular pipe 12 employs a composite plug system as will be described herein. The process includes the preliminary step of initially inserting a fastener 16 having a threaded shank and a head through an opening 18 in an oblong inner plate 20.

FIGS. 4, 4A and 4B show the composite plug system following completion of the installation. The oblong inner plate 20 has a first, elongated diameter shown by arrow 22 and a second, shorter diameter shown by arrow 24. The first, elongated diameter 22 is larger than the diameter of the hole 14 in the tubular pipe 12, while the second, shorter diameter 24 is smaller than the diameter of the hole 14.

As seen in FIG. 1, grasping the threaded shank of the fastener 16 so that the oblong plate is supported by the head of the fastener, the oblong plate 20 is inserted into and through the pipe hole 14 in the tubular pipe 12. Once this is accomplished, the elongated plate is within the tubular pipe 12 and beneath the pipe hole 14. As seen in the sectional view in FIG. 4, the oblong plate 20 abuts and is flush with the inner wall of the tubular pipe 12.

The oblong plate 20 is substantially flat but may be slightly resilient or curved. The oblong inner plate is composed of a fibrous material. More particularly, in a preferred embodiment, the oblong inner plate 20 is composed of approximately 25 to 50% by volume of carbon fiber along with an epoxy. Alternatively, the fibrous material may be fiber glass, kevlar or similar material within the spirit and scope of the present invention.

The opening 18 through the oblong inner plate is beveled or tapered, as best seen in FIG. 4A, so that the angular orientation of the threaded fastener 16 with respect to the oblong inner plate 20 may be altered during the step of inserting the oblong plate 20 into and through the pipe hole 14 of the tubular pipe 12. The fastener 16 is permitted to move between a position perpendicular to the oblong plate 20 (as shown in dashed lines in FIG. 4A) and a position in angular orientation therewith. The provision for altering the angular orientation of the fastener assists in inserting the oblong plate 20 into and within the tubular pipe.

As best seen in FIG. 2, a subsequent step includes applying an adhesive filler 26 over the oblong inner plate 20 over the pipe hole 14. The adhesive filler 26 is an initially liquid adhesive which cures to a solid. In one preferred embodiment, the adhesive filler is a liquid epoxy. More particularly, the liquid epoxy is a two-part epoxy which cures to a solid. The liquid adhesive filler is highly viscous having a putty-like consistency so that it does not run before setting and becoming solid.

Thereafter, as seen in FIG. 3, an outer plate 30 having a central opening 32 and a diameter 34 is placed over the fastener 16 so that it is over and flush with the tubular pipe 12 as seen in FIG. 3. The outer plate is substantially flat but may be slightly compliant. As best seen in FIG. 4B, the outer plate 30 has a diameter larger than the pipe hole 14.

Thereafter, the outer plate 30 is secured to the composite plug assembly by a wing nut 36 or other fastener mechanism. The wing nut 36 is hand tightened and operates to assure proper dispersion of the epoxy between the plates. The outer plate 30 is composed of the same material as the oblong inner plate 20. In one preferred embodiment, both the oblong inner plate 20 and the outer plate 30 are each composed of a fibrous material. More particularly, the oblong inner plate 20 and the outer plate 30 are composed of approximately 25 to 50% by volume of carbon fiber along with an epoxy. Alternatively, the fibrous material may be fiberglass, kevlar or similar material within the spirit and scope of the present invention.

Both the oblong inner plate 20 and the outer plate 30 are also composed of an epoxy material which is mixed with the fibrous material. Alternatively, the fibrous material may be mixed with polyester, vinylester, polyurethane, methacrylates, or cyanate esters.

The assembly of the completed composite plug is illustrated in the sectional view shown in FIG. 4. The oblong inner plate 20 and head of the fastener 16 does not protrude significantly within the interior of the pipeline.

FIGS. 5 and 6 show an additional, optional procedure that may be utilized in addition to the foregoing process. The extended, threaded end of the fastener 16 extending radially from the tubular pipe 12 is cut off or removed with a grinder. A highly viscous liquid adhesive 26 is thereafter applied over top of the composite plug assembly including the outer plate 30, fastener 16 and the tubular pipe 12 as best seen in FIG. 5. This creates a gradual transition between the outer plate 30 and the pipe 12. Finally, as seen in FIG. 6, a fabric material 40 is impregnated with a lower viscosity epoxy. In one preferred procedure, the epoxy is rolled or otherwise applied to the dry fabric. Thereafter, the combined fabric and epoxy is wrapped around the pipe 12.

Table 1 below illustrates the results of test data using various different hole repair procedures. The tests were conducted on nominal six inch diameter, schedule 40, Grade B steel pipes with identical one inch diameter holes. In the tests, a high pressure line was utilized having a maximum allowable operating pressure of 2130 lbs per square inch (psi).

TABLE 1

Failure Pressure of Holes Repaired by Various Means

| Test Number | Repair Method | Hole Dia. (Inches) | Pipe Diameter (Nominal/Sched 40) | Number of Wraps | Failure Pressure (Psi) |
|---|---|---|---|---|---|
| 1 | Over-wrap | 1.00 | 6 inch | 2 | 675 |
| 2 | Composite Plug | 1.00 | 6 inch | 0 | 3,400 |
| 3 | Plug and Wrap | 1.00 | 6 inch | 2 | 4,775 |

In test number 1, a carbon reinforced epoxy over wrap (consisting of 2 plies) was applied without use of the composite plug system of the present invention and the over wrap failed at a pressure of 675 psi. In test number 2, use of the composite plug process and system of the present invention yielded a failure pressure of 3400 psi, which is significantly over the maximum allowable operating pressure. In test number 3, utilization of the composite plug system and the additional, optional carbon reinforced epoxy over wrap (consisting of 2 plies) yielded a failure pressure of 4775 psi.

It will be appreciated that the present invention may be employed without any welding and may be employed in the field with a minimum of equipment and personnel.

Whereas, the present invention has been described in relation to the drawings attached hereto, it should be understood that other and further modifications, apart from those shown or suggested herein, may be made within the spirit and scope of this invention.

What is claimed is:

1. A process to repair a hole in a tubular pipe, which process comprises:
    inserting a fastener through an opening in a slightly resilient oblong inner plate having an elongated diameter and a shorter diameter;
    inserting said oblong plate into said pipe hole while altering the angular orientation of said fastener with respect to said oblong plate wherein said elongated diameter is greater than a diameter of said pipe hole and wherein said shorter diameter is less than said hole diameter so that said oblong plate is within said tubular pipe beneath said hole;
    applying an adhesive filler on said oblong plate over said pipe hole to completely cover and fill said pipe hole;
    affixing an outer plate having an opening and a diameter larger than said pipe hole diameter over said pipe hole so that said opening receives said fastener;
    securing said outer plate to said oblong plate and said tubular pipe with said fastener until said adhesive filler cures to a solid so that said adhesive and said oblong plate forms a fluid tight seal;
    removing a portion of said fastener extending radially outward from said tubular pipe;
    covering said outer plate and surrounding pipe with an adhesive; and
    applying an adhesive impregnated fabric around said pipe and said outer plate.

2. A process to repair a hole in a tubular pipe as set forth in claim 1 including fabricating said oblong inner plate from carbon fiber and epoxy.

3. A process to repair a hole in a tubular pipe as set forth in claim 2 wherein said oblong plate is approximately 25%-50% of said carbon fiber by volume.

4. A process to repair a hole in a tubular pipe as set forth in claim 1 including fabricating said outer plate from carbon fiber and epoxy.

5. A process to repair a hole in a tubular pipe as set forth in claim 4 wherein said outer plate is approximately 25%-50% of said carbon fiber by volume.

6. A process to repair a hole in tubular pipe as set forth in claim 1 wherein said fastener is a threaded bolt and said outer plate is secured to said oblong plate with a wing nut connected to said threaded bolt.

7. A process to repair a hole in a tubular pipe as set forth in claim 1 wherein said adhesive filler applied on said oblong plate over said pipe hole is a liquid epoxy which cures to a solid.

8. A process to repair a hole in a tubular pipe as set forth in claim 7 wherein said epoxy is a two-part epoxy.

9. A process as set forth in claim 1 wherein said adhesive is applied circumferentially around said pipe.

10. A process as set forth in claim 1 wherein said adhesive covered said outer plate and surrounding pipe is an epoxy.

11. A process as set forth in claim 1 wherein said impregnated fabric is a carbon fiber wrap impregnated with a two part epoxy.

12. A composite plug to repair a hole in a tubular pipe, which composite plug comprises:
    a slightly resilient oblong inner plate having an elongated diameter greater than a diameter of said hole and a shorter diameter less than said diameter of said hole, wherein said oblong plate is within said tubular pipe and beneath said hole;
    a fastener extending through an opening in said oblong inner plate and extending through said pipe hole wherein said opening in said oblong plate is beveled to permit angular orientation of said fastener with said oblong inner plate;
    an outer plate having an opening and a diameter larger than said pipe hole diameter placed over said pipe hole so that said opening receives said fastener;
    an adhesive filler filling a space between said oblong inner plate and said outer plate;
    means to secure said outer plate to said oblong inner plate with said fastener until said adhesive filler cures to a solid; and
    means to remove a portion of said fastener extending radially outward from said tubular pipe, to cover said outer plate and surrounding pipe with an adhesive, and to apply an adhesive impregnated fabric around said pipe and said outer plate.

13. A composite plug as set forth in claim 12 including an adhesive applied over said outer plate and surrounding said pipe and including an adhesive impregnated fabric wrapped around said pipe and said outer plate.

14. A composite plug as set forth in claim 12 wherein said adhesive filler is a liquid two-part epoxy which cures to a solid.

15. A composite plug as set forth in claim 12 wherein said oblong inner plate in composed of carbon fiber epoxy.

16. A composite plug as set forth in claim 12 wherein said outer plate is composed of carbon fiber and epoxy.

17. A composite plug as set forth in claim 12 wherein said fastener is a threaded bolt and wherein said means to secure said outer plate includes a wing nut.

* * * * *